(12) United States Patent
Barker et al.

(10) Patent No.: US 7,344,320 B2
(45) Date of Patent: Mar. 18, 2008

(54) WALKING STAFF WITH TRIPOD BASE AND ADAPTABLE MOUNT

(75) Inventors: John Christopher Barker, Oceanside, OR (US); Patrick Arthur Kennedy, Portland, OR (US)

(73) Assignee: Trek Technologies, LLC, Lake Oswego, OR (US)

( * ) Notice: Subject to any disclaimer, the term of this patent is extended or adjusted under 35 U.S.C. 154(b) by 142 days.

(21) Appl. No.: 11/083,676

(22) Filed: Mar. 16, 2005

(65) Prior Publication Data

US 2005/0207749 A1    Sep. 22, 2005

Related U.S. Application Data

(60) Provisional application No. 60/554,298, filed on Mar. 17, 2004.

(51) Int. Cl.
*G03B 17/56* (2006.01)
*A45B 3/00* (2006.01)

(52) U.S. Cl. .......................... 396/419; 135/66; 135/75; 135/84; 248/155.1; 248/155.5; 248/187.1

(58) Field of Classification Search ................ 396/419, 396/427, 428; 42/94; 135/66, 75, 77, 84; 248/155–155.5, 157, 166, 170, 187.1
See application file for complete search history.

(56) References Cited

U.S. PATENT DOCUMENTS

| | | | | |
|---|---|---|---|---|
| 345,852 A * | 7/1886 | Leermo | ................ | 248/155.2 |
| 499,719 A * | 6/1893 | Dabney | ................ | 248/155.2 |
| 714,043 A * | 11/1902 | Seitz | ................ | 248/170 |
| 1,089,295 A * | 3/1914 | Vallier | ................ | 248/155.1 |
| 1,138,417 A * | 5/1915 | Rottenburg | ................ | 248/155 |
| 1,679,267 A | 7/1928 | Rieger | | |
| 3,286,212 A * | 11/1966 | Thompson et al. | ...... | 248/187.1 |
| 4,062,372 A | 12/1977 | Slusher | | |
| 5,438,786 A | 8/1995 | Hilderbrand | | |
| 6,192,908 B1 * | 2/2001 | Smith | ................ | 135/66 |
| 6,769,824 B2 * | 8/2004 | Nakatani | ................ | 396/419 |
| 2004/0118985 A1 * | 6/2004 | Omps | ................ | 248/181.1 |

* cited by examiner

*Primary Examiner*—W. B. Perkey
(74) *Attorney, Agent, or Firm*—Steven J. Adamson

(57) ABSTRACT

A staff apparatus having a leg assembly with multiple movable legs. In one embodiment, the leg assembly includes three legs to form a tripod. The staff apparatus may include an adaptable magnetic-based mount for releasably attaching a camera, spotting scope, gun or arm rest, or other item. The mount may be movable or non-movable. A shaft may include multiple telescoping sections, and an upper section may telescope into a lower section. Various embodiments and features of the staff apparatus are disclosed.

34 Claims, 5 Drawing Sheets

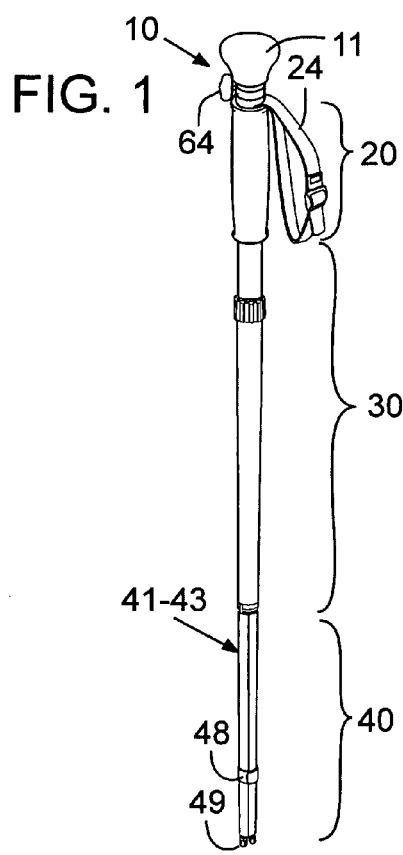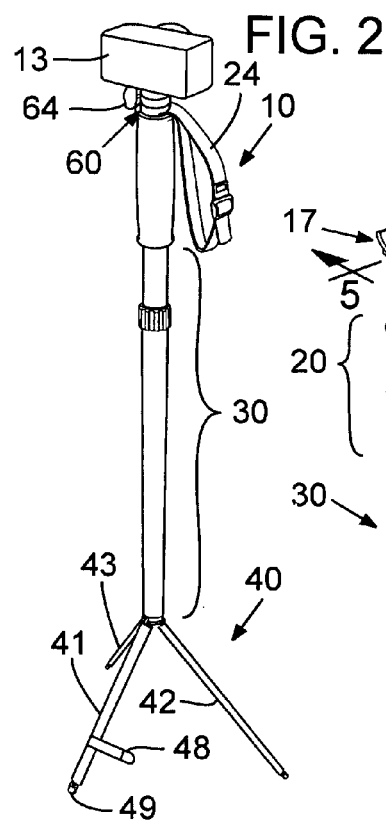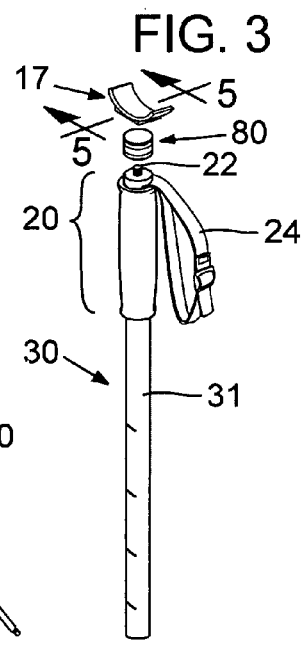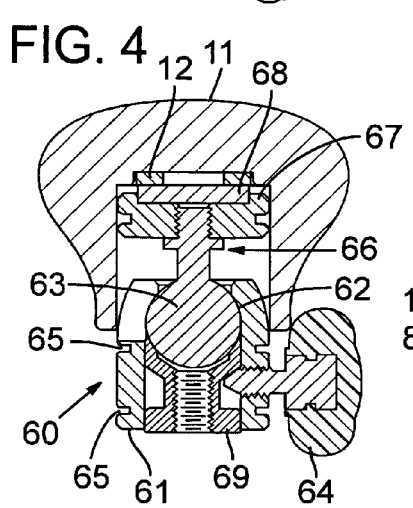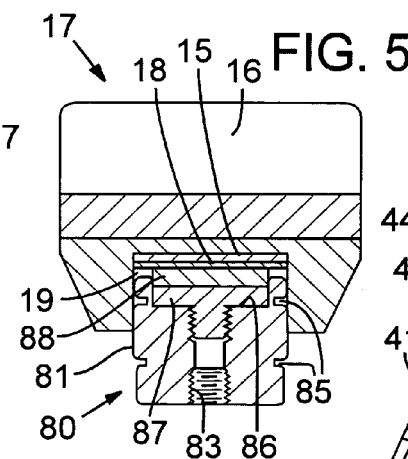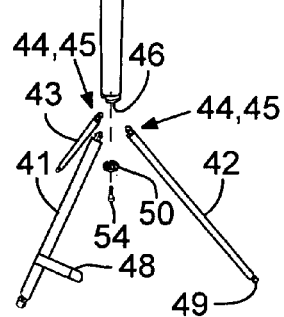

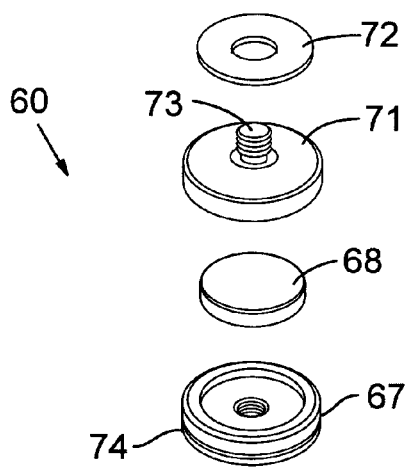
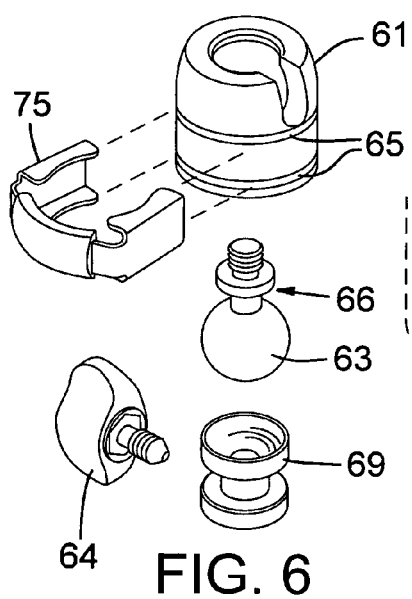
FIG. 6
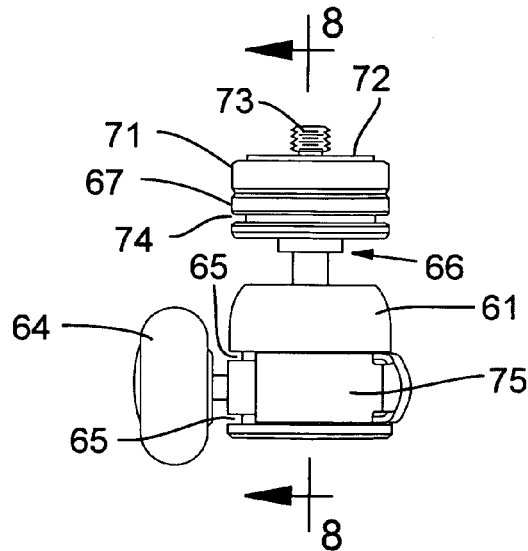
FIG. 7
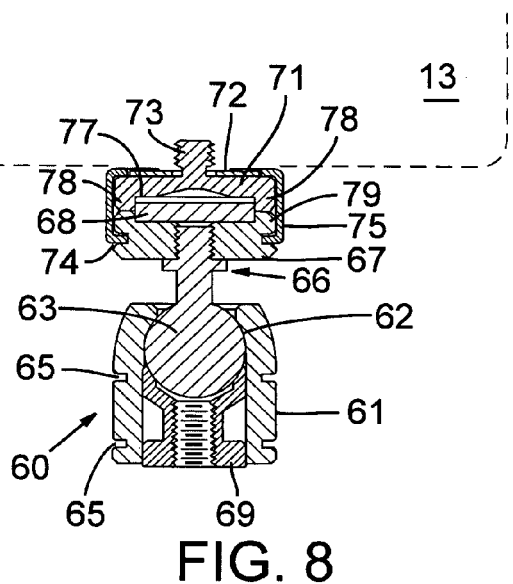
FIG. 8

WALKING STAFF WITH TRIPOD BASE AND ADAPTABLE MOUNT

CROSS REFERENCE TO RELATED APPLICATIONS

This application claims the benefit of U.S. provisional Application No. 60/554,298, filed Mar. 17, 2004, entitled Walking Staff with Tripod Base, and having a common inventor.

FIELD OF THE INVENTION

The present invention relates to a staff of the type used in walking, photography, hunting, or the like. More specifically, the present invention relates to a walking staff that provides increased stability and/or provides an adaptable mount to receive a camera, gun rest, spotting scope or other item.

BACKGROUND OF THE INVENTION

Various walking staff and like devices are known in the art. These include, among others, the devices described in U.S. Pat. No. 1,679,267 for a combined Walking Stick and Tripod; U.S. Pat. No. 4,062,372 for an Articulated Walking Cane; U.S. Pat. No. 5,438,786 for a Pistol Rest; and U.S. Pat. No. 6,085,766 for a Geary Convertible Crutch System.

While these devices make a contribution to the art of walking staffs and tripods, they are disadvantageous for several reasons including, but are not limited to, being too bulky, too heavy, too complicated or not sufficiently stable. For example, the tripod configuration of the '786 patent is small relative to the height of its staff, providing limited stability. Furthermore, the tripod configuration of the '786 patent utilizes lateral supports (for the tripod legs) which adds undesirably to the weight and bulk of the device. Additional weight and bulk are disadvantageous in a walking staff, particularly near the bottom end which a user must precisely place between stones, roots and other obstacles (using primarily the strength of their hand and forearm). In addition, the lateral supports (and related components) increase the complexity of the tripod mechanism and thus, the incidence of mechanical failure, e.g., lateral supports and related components are vulnerable to being bent, broken or otherwise failing, rendering the staff unusable. Furthermore, given the multiple parts and their interrelation, field repair is difficult if not impossible.

Prior art staffs and like devices also fail to provide an adaptable mechanism for the rapid, secure and releasable mounting of a camera, spotting scope, gun rest, or other item.

BRIEF DESCRIPTION OF THE DRAWINGS

FIGS. 1-3 are perspective views of a walking staff incorporating a tripod 40 in accordance with the present invention.

FIG. 4 is a cross-sectional side view of an adaptable movable mount in accordance with the present invention.

FIG. 5 is a cross-sectional side view of an adaptable non-movable mount in accordance with the present invention.

FIG. 6 is an exploded view of an adaptable movable mount in accordance with the present invention.

FIG. 7 illustrates a side view of the mount of FIG. 6 in an assembled configuration.

FIG. 8 presents a cross-sectional side view of the mount of FIGS. 6-7 attached to a camera or other device.

DETAILED DESCRIPTION

Figure 9:
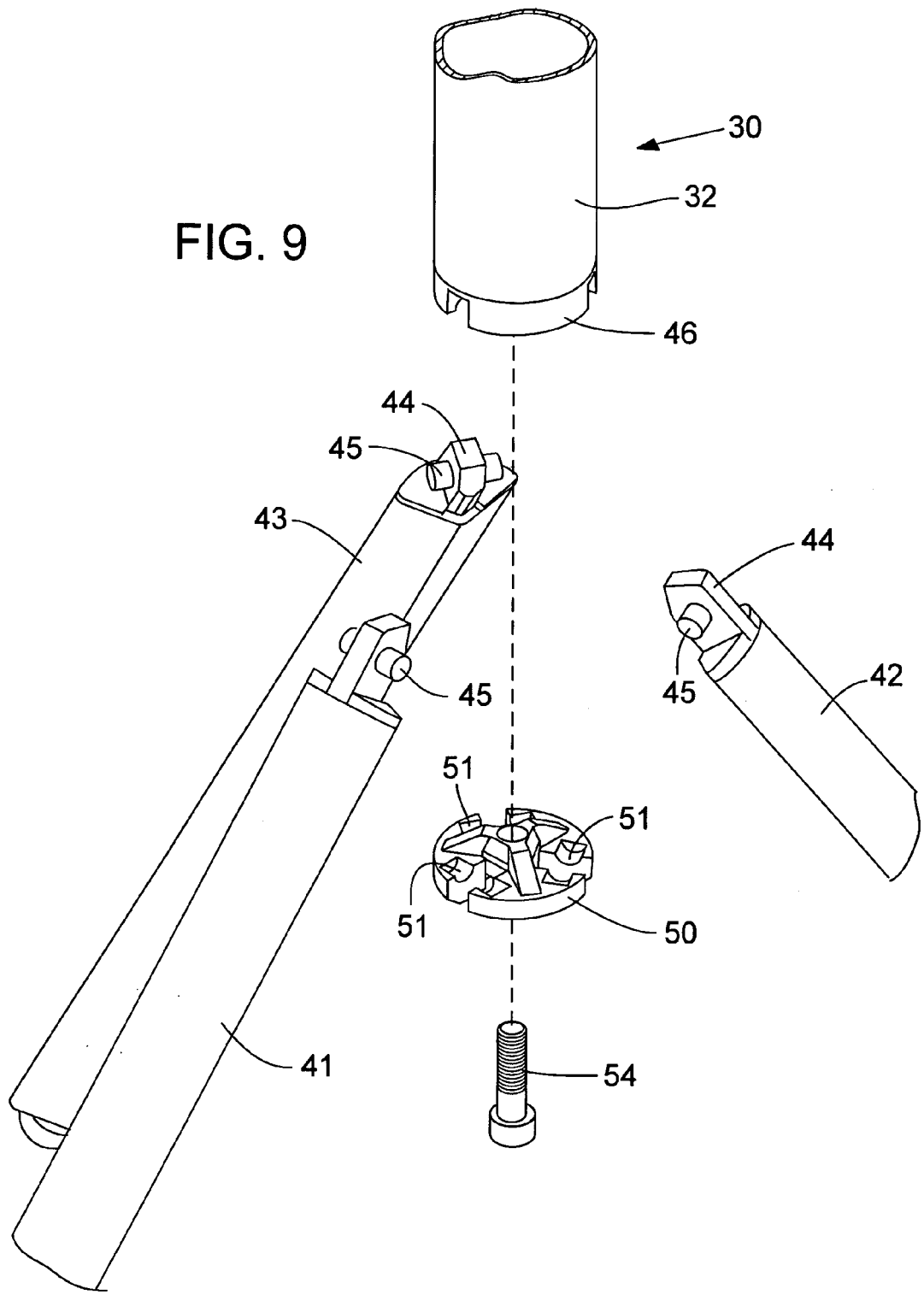
FIG. 9 an exploded view of components for mounting tripod legs to a shaft in accordance with the present invention.

Referring to FIG. 1, a perspective view of one embodiment of a walking staff 10 incorporating a tripod 40 in accordance with the present invention is shown. Staff 10 as illustrated in FIG. 1 includes a palm rest 11 mounted about handle region 20.

Handle region 20 may include an appropriately shaped grip made of cork, rubber or other suitable material. An adjustable strap 24 may be provided adjacent the grip. A telescoping shaft 30 is preferably provided below handle region 20 and tripod 40 is preferably provided below shaft 30. FIG. 1 illustrates tripod legs 41-43 in their "retracted" or monopod position. A leg strap or the like 48 maintains the tripod legs in this monopod position. As discussed in more detail below, the present invention includes an adaptable mount that permits releasable and secure attachment of palm rest 11 or other items such as a camera, spotting scope, gun or arm rest, surveying equipment, or other. In FIG. 1, one embodiment of an adaptable mount in accordance with the present invention is shown. This mount is movable mount 60. Set screw 64 is shown extending from movable mount 60. Referring to FIG. 2, staff 10 is illustrated with a camera 13 releasably mounted to adaptable movable mount 60. Movable mount 60 as discussed in more detail with reference to FIGS. 4 and 6-8 may include a conventional ball and socket movable mounting structure or other suitable movable mounting structure, among other features. Set screw 64 is shown extending from movable mount 60 in the perspective of FIG. 1.

Tripod legs 41-43 are shown in their expanded "tripod" position. Leg tension may be set by a user as described below to permit a user to position legs 41-43 where he or she would like. It will be recognized that in the embodiment of FIG. 2 and other figures, the tripod legs 41-43 have no additional lateral support mechanism, i.e., they move in a manner substantially free of supplemental lateral support (in contrast to the '786 patent discussed above). While shaft 30 is shown at the same height as in FIG. 1, it should be recognized that shaft 30 may be extended (or contracted) to different heights. It should also be recognized that the pivotal leg assembly including legs 41-43 (in the closed or retracted position) may be less than half the overall height of staff 10 with shaft 30 contracted.

Referring to FIG. 3, a perspective exploded view of staff 10 with a gun or shooting rest 17 provided on top in accordance with the present invention is shown. Handle region 20 may have a threaded member or other fastening means 22 extending from its top end. Such members and means are known in the art.

FIG. 3 illustrates another embodiment of an adaptable mount in accordance with the present invention. This adaptable mount is a non-movable or "rigid" mount 80. Mount 80 is preferably screwed onto threaded member 22 or otherwise attached to device 10. Adaptable mount 80 provides releaseable mounting of rest 17 or other items as as discussed below with reference to FIG. 5.

Shaft 30 may include an upper shaft section 31 and a lower shaft section 32, or any other number of sections. A releasable locking ring or other releasable locking mechanism 34 is provided near the intersection of the upper and lower shaft sections to permit a user to adjust the height of the shaft. Various releasable locking mechanisms and telescoping shaft arrangements are known in the art. In the embodiments of FIGS. 1-3, the upper shaft section preferably telescopes into the lower shaft section providing a large base from which to couple tripod legs 41-43. Furthermore, this arrangement provides a narrower handle region than the converse which is ergonomically beneficial, i.e., the narrow handle region may be more comfortable to the average human hand.

While several leg attachments schemes may be used without deviating from the present invention, in one embodiment tripod legs 41-43 each include an extension member 44 that supports a mounting pin 45 (members 44 and pins 45 are shown in more detail in FIGS. 9-12). Each of these pins 45 is positioned within a complementary recess 51 (also shown in FIGS. 9-12) in a mounting disk 50. Each recess 51 in mounting disk 50 accommodates approximately one-half (the bottom half) of a pin 45 and a corresponding recess in a mounting plate 46 accommodates approximately the other half (the top half) of a pin 45. A fastening member 54 couples the mounting disk to the mounting plate with the three pins 45 resting in their respective recesses 51 in mounting disk 50. As the fastening member 54 is tightened, the mounting pins are pushed upward and into contact with walls of the corresponding recesses in mounting plate 46. Tightening the fastening mechanism further increases the compression force on mounting pins 45 and hence increases the tension on legs 41-43, permitting a user to adjust how resistant the legs are to movement.

Referring to FIG. 4, a cross-sectional side view of an adaptable movable mount 60 receiving palm rest 11 (or another item) in accordance with the present invention is shown. Movable mount 60 may include a body 61 that defines a socket 62 for receiving a ball 63. A set screw 64 is preferably threaded into body 61 in such a manner as to releasably secure a set position of ball 63 within socket 62. Various ball and socket positioning mechanisms are known in the art. Body 61 may also define a plurality of grooves 65 which may hold a security clip (not shown, but discussed in more detail below with reference to FIGS. 6-8) when that clip is not in use.

Ball 63 may have an extender 66 mounted to or formed integrally therewith that supports the plate 67 that securely receives magnet 68. Magnet 68 may be formed of neodymium iron boron or another suitable magnetic material. Palm rest 11 may have a magnetically active ring 12 mounted to its underside. The attraction between this magnetically active ring and magnet 68 provides releasable attraction of palm rest 11 to mount 60.

Referring to FIG. 5, a cross-sectional side view of an adaptable non-movable mount 80 receiving gun rest 17 in accordance with the present invention is shown. Non-movable mount 80 may include a body 81 having a threaded recess 83 for mounting to threaded member (22 of FIG. 3). A plate 87 is preferably mounted within a top recess 86 in body 81. Plate 87 holds magnet 88. Grooves 85 may be provided to hold a security clip (not shown), though with gun rest 17 mounted on mount 80 the top groove is not accessible.

Gun rest 17 may have a magnetically active member 18 mounted in a recess 19 formed on its underside. A rubber or like insulative member 15 may be glued in place between the magnetically active member 18 and the remainder of gun rest 17. The gun rest may be mounted onto mount 80 with magnetically active member 18 contacting magnet 88. Gun rest 17 may also include a pad or the like 16 to receive the stock or barrel of a gun, etc. Referring to FIG. 6, an exploded view of adaptable movable mount 60 in accordance with the present invention is shown. FIG. 7 illustrates a side view of the components of mount 60 of FIG. 6 in an assembled configuration. FIG. 8 presents a cross-sectional side view of the mount 60 of FIGS. 6-7 attached to a camera 13 or other device.

FIG. 6 illustrates various components of mount 60 configured to mount to a camera (not shown) or other device having a standard or otherwise appropriate attachment mechanism. Body 61 is configured with positioning member 69 to define the socket 62 that holds ball 63. Extender 66 protrudes from body 61 and couples to plate 67 in which magnet 68 is mounted. Security clip 75 may clip onto grooves 65 when not in use.

A magnetically active disk 71 is preferably provided for releasable attachment to magnet 68. Threaded member 73 is attached to disk 71 and permits releasable coupling of disk 71 into the threaded recess provided in most cameras, scopes and other items. A spacer washer 72 may be provided about threaded member 73. The spacer washer 72 is preferably semi-compliant to provide friction at the attachment point of an external object (camera, etc.) and is suitably sized to act as a spacer for clip 75.

In FIGS. 7-8, magnetically active disk 71 is shown coupled by magnetic attraction to magnet 68. Magnet 68 is obscured from view in FIG. 7 by plate 67 and disk 71, though visible in the cross-section of FIG. 8. In FIG. 8, threaded or otherwise fastening member 73 is mounted into a camera 13 or other object. Clip 75 is moved from its storage position shown in FIG. 7 to its device locking position shown in FIG. 8. In this locking position, clip 75 couples into grooves 74 of plate 67 and onto the top surface of disk 71 adjacent spacer washer 72. While magnet 68 is sufficiently strong to hold a camera or other device, clip 75 is provided for extra security.

FIG. 8 also illustrates recess 77 provided on the underside of disk 71. Lip 78 borders the recess and prevents disk 71 from sliding laterally off magnet 68. A similar lip arrangement 79 may be provided on plate 67.

Referring to FIG. 9, an exploded view of components for mounting tripod legs 41-43 to shaft 30 in accordance with the present invention is shown. FIG. 9 illustrates extension members 44 and pins 45 extending from each leg 41-43. These pins rest within recesses 51 in mounting disk 50. Mounting plate 46 has similarly yet oppositely arranged recesses that receive the top part of pins 45. Pins 45 are placed in recesses 51 and then mounting disk 50 is coupled to mounting plate 46 by fastener 54. Mounting plate 46 is securely mounted within the lower section 32 of shaft 30.

Figure 10:
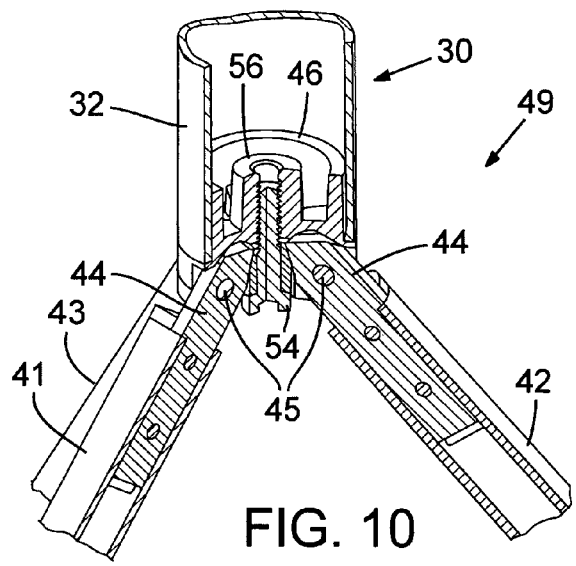
FIG. 10 is a sectional cut-away of the pivot leg joint of FIG. 9.

FIG. 10 is a sectional cut-away of the pivot leg joint 49. Extension members 44 may be longitudinally positioned within legs 41-43 for increased strength and stability. Pins 45 extend laterally into recesses 51. Fastening member 54 may be mounted into a fastener receptacle 56 in mounting plate 46 to securely hold the legs. Mounting plate 46 may be glued or otherwise securely positioned in the lower section 32 of shaft 30.

Figures 11, 12:
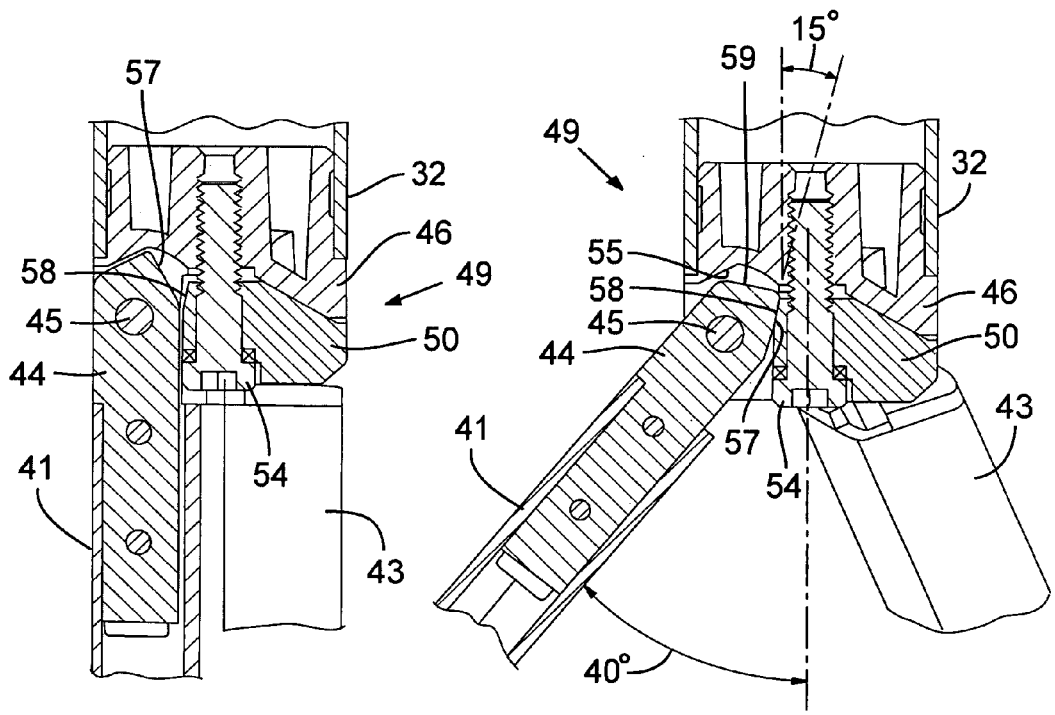
FIGS. 11-12 illustrate cross-sectional views of the tripod leg joint of FIG. 10 in the closed and open positions, respectively.

FIGS. 11-12 illustrate cross-sectional views of tripod leg joint 49 in the closed and open positions respectively. Each extension member 44 preferably includes an angled bearing face 57 that contacts a complementarily configured face 58 on mounting disk 50. The angle at which these bearing faces contact one another (shown in FIG. 12) may be any suitable load distributing angle, but is preferably between 5-50 degrees, more preferably between 10-30 degrees, and yet more preferably at approximately 15 degrees. The angled bearing surface serves to more effectively distribute the load placed on legs 41-43 during use.

The tripod legs may extend any suitable distance laterally. In one embodiment, they extend between 30 and 50 degrees and, more preferably, to approximately 40 degrees.

Mounting plate 46 is preferably configured with ample clearance for each extension member to move, though it may contain contact surface 55 that contacts extension member surface 59 and prevents the legs from swinging too far past vertical when retracting into the monopod configuration.

Figure 13:
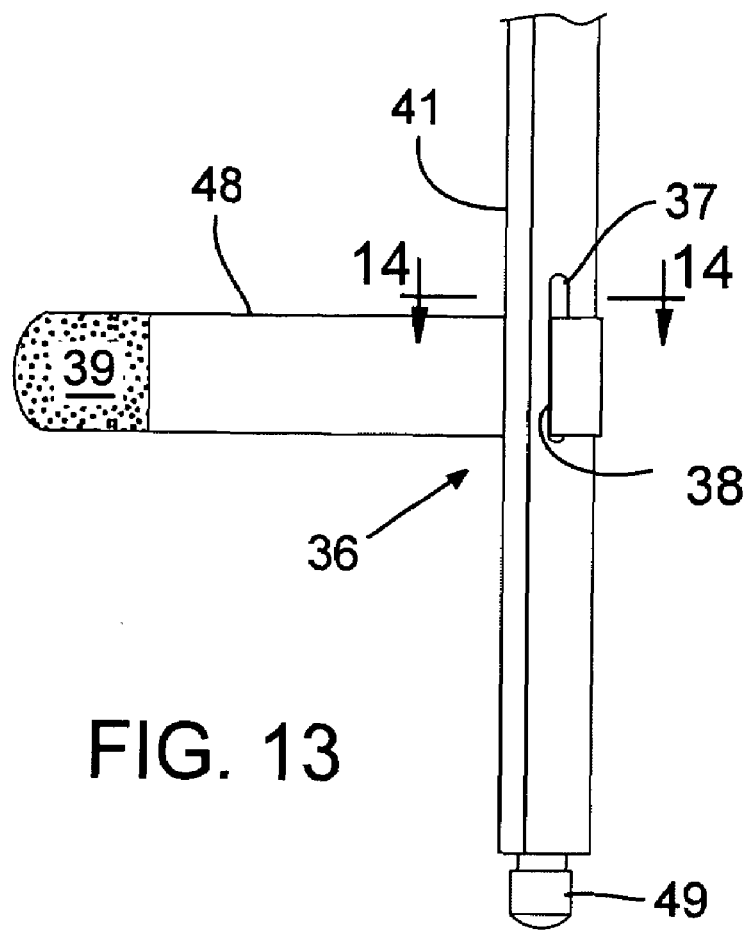
FIGS. 13-14 are a side elevation view and a top plan view of a slot and corresponding strap in accordance with the present invention.
Figure 14:
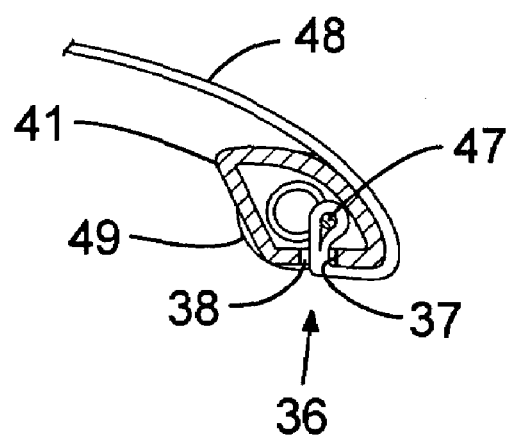

Referring to FIGS. 13-14, a side elevation and a top plan view of a slot 36 and strap 48 in accordance with the present invention is shown. Strap 48 may be formed about a filament or other small preferably flexible cylindrically shaped item 47. In one embodiment, item 47 is formed of fishing line. Strap 48 is preferably glued and/or stitched around item 47.

Slot 36 may include an upper slot 37 and a lower slot 38, configured of suitable dimensions that strap 48 with item 47 mounted therein can be slid through upper slot 37 into the interior of the leg and extend out of the narrower lower slot 38. The distal end of strap 48 may include hook and/or loop material (i.e., Velcro®) and fasten by that or other suitable means.

A foot 49 is visible in FIGS. 13-14.

The components of the present invention may be made of any suitable material, either now known or invented or discovered in the future. In one embodiment, the shaft and legs are preferably formed of a lightweight, rigid material such aluminum or an aluminum alloy or the like. The legs, however, may be made of any suitable lightweight and rigid material including, but not limited to, titanium, carbon fiber and other materials, including materials with these characteristics that are not yet invented.

The extension members and pins may be formed of a harder metal or a hard plastic and the mounting disk and plate may similarly be made of metal, plastic or other materials that provide adequate strength, lightness and durability.

The non-magnetic or non-magnetically active components for mounts 60,80 may be made of aluminum, an alloy, plastic or other suitable material. The plate that holds the magnet may be a ferromagnetic material.

The text above mentions the terms magnets and magnetically active material. It is to be understood that the term magnet refers to a material that creates a magnetic field. The term magnetically active refers to a material that is attracted by a magnetic field, which can include another magnet, or a ferromagnetic material such as steel. It should further be recognized that while the magnet and magnetically active member arrangement as discussed above is preferred in one embodiment, the magnet and magnetically active member may be reversed without departing from the present invention.

One alternative embodiment of the present invention includes providing two legs instead of three, changing device 10 from a tripod to a bipod. In this embodiment, leg 43 is removed and legs 41-42 may be made larger in their lateral cross-section. This alternative embodiment could be used with a gun or large camera lens or the like, where the bipod provides enhanced stability but is held upright by user positioning of the gun or camera lens, etc. Another alternative embodiment includes providing four leg instead of three to create a quadpod. In this embodiment, an additional legs is added and each legs is reduced in lateral cross-section.

Shaft 30 may be telescoping or non-telescoping.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A walking staff apparatus, comprising:
   a shaft;
   a handle region provided at one end of the shaft; and
   a leg assembly including multiple movable legs provided at a bottom of the shaft substantially opposite the handle region, the leg assembly configured such that the legs move pivotally between a closed position and an open position, the location from which the pivotal leg movement occurs being substantially fixed relative to the shaft; and
   wherein the leg assembly is configured such that the legs move between the closed position and the open position in a manner substantially free of supplemental lateral support;
   wherein the leg assembly includes at least three legs and each of the legs is coupled, within the leg assembly, by a separate, non-coaxial pivot member;
   wherein the walking staff apparatus is configured such that in use the distal end of each leg contacts the ground in the closed position and in the open position; and
   wherein the shaft includes an upper section and a lower section that are located above the leg assembly and configured for longitudinally telescoping movement.

2. The apparatus of claim 1, wherein the leg assembly in the closed position is less than half the overall height of the walking staff apparatus.

3. The apparatus of claim 1, wherein the upper section is configured for telescoping movement into and out of the lower section.

4. The apparatus of claim 3, wherein the leg assembly in the closed position is less than half the overall height of the walking staff apparatus when the upper section is telescoped into the lower section.

5. The apparatus of claim 1, wherein the cross-sectional area defined by the combined outer perimeter of the legs is substantially, the same or less than the cross-sectional area defined by the circumference of the shaft.

6. The apparatus of claim 1, further comprising a mounting disk coupling the legs to the shaft, each leg including a mounting member and the mounting disk supporting each mounting member from underneath, and a user controllable mechanism for setting the amount of mounting pressure applied by the mounting disk on the legs and thereby the tension attributable to movement of the legs.

7. The apparatus of claim 1, further comprising a mount assembly for releasable magnetic-based attachment of an article to the staff apparatus, the mounting assembly being movable by a user.

8. The apparatus of claim 1, further comprising a mount assembly having a magnet for releasable magnetic-based attachment of an article to the walking staff apparatus.

9. The apparatus of claim 8, wherein the mount assembly includes a mechanism that supports releasable lockable movement of an article coupled to the mount assembly.

10. The apparatus of claim 9, further comprising a magnetically active member having a mechanical fastening mechanism coupled thereto, the magnetically active member configured for releasable magnetic-based attachment to the magnet.

11. The apparatus of claim 10, further comprising a security mechanism for reinforcing the releasable attachment of the magnetically active member to the magnet.

12. The apparatus of claim 9, wherein the mount assembly further includes at least one of a palm rest and a gun rest.

13. The apparatus of claim 1, wherein at least one of the movable legs includes a slot having a wider opening towards the top and a narrower opening towards the bottom and the staff apparatus further comprises a leg strap having an end region that is thicker than an average thickness of the strap, the thicker end region being insertable into the wider opening and retained behind the narrower opening.

14. A walking staff apparatus, comprising:
a shaft having handle region at one end of the shaft;
a leg assembly including multiple movable legs coupled to an opposite end of the shaft, the leg assembly configured such that the legs move pivotal between a closed position and an open position; and
a mount assembly including a magnet for releasable magnetic-based attachment of an article to the walking staff apparatus.

15. The apparatus of claim 14, wherein the mount assembly is movable, thereby permitting user controlled positioning of an article releasably mounted at the mount assembly.

16. The apparatus of claim 14, further comprising an magnetically active member having a mechanical fastening mechanism coupled thereto, the magnetically active member configured for releasable magnetic-based attachment to the magnet.

17. The apparatus of claim 16, further comprising a security mechanism for reinforcing the releasable attachment of the magnetically active member to the magnet.

18. The apparatus of claim 14, wherein the shaft includes an upper section and a lower section and the upper section is configured for telescoping movement into and out of the lower section.

19. The apparatus of claim 14, wherein the leg assembly in the closed position is less than half the overall height of the staff apparatus.

20. The apparatus of claim 14, wherein the leg assembly includes at least three legs.

21. The apparatus of claim 14, wherein the leg assembly is configured such that the legs move pivotal between a closed position and an open position and wherein the legs move between the closed and open positions substantially without a supplemental lateral support member.

22. A walking staff apparatus, comprising:
a shaft having an upper section and a lower section, the upper section including a handle region; and
a leg assembly coupled to the lower section of the shaft and including at least three movable legs;
wherein the upper section is configured for telescoping movement into and out of the lower section; and
wherein the three movable legs are each coupled through a separate, non-coaxial pivot member to a bottom region of the lower section.

23. The apparatus of claim 22, wherein at least one of the movable legs includes a slot having a wider opening towards the top and a narrower opening towards the bottom and the walking staff apparatus further comprises a leg strap having an end region that is thicker than an average thickness of the strap, the thicker end region being insertable into the wider opening and retained behind the narrower opening.

24. The apparatus of claim 22, further comprising a mount assembly for releasable magnetic-based attachment of an article to the staff apparatus, the mounting assembly being movable by a user.

25. The apparatus of claim 22, further comprising a mount assembly having a magnet for releasable magnetic-based attachment of an article to the staff apparatus, the mounting assembly being movable by a user.

26. The apparatus of claim 22, wherein the cross-sectional area defined by the combined outer perimeter of the legs is substantially the same or less than the cross-sectional area defined by the circumference of the shaft.

27. The apparatus of claim 22, wherein the leg assembly in the closed position is less than half the overall height of the staff apparatus when the upper section is telescoped into the lower section.

28. A walking staff comprising:
a shaft;
a leg assembly mount coupled to a lower end of the shaft and including at least three leg receiving angled bearing faces;
at least three legs pivotally coupled to the leg assembly mount such that the legs can be stowed into a monopod configuration and deployed into a tripod configuration, each of the three legs including a member that extends above its point of pivotal coupling and defines a load bearing face that moves inwardly as the leg is moved outwardly towards the tripod position;
wherein, in the tripod configuration, outward pivoting of each leg is limited by contact of the load bearing face of that leg with its corresponding leg receiving angled bearing face of the leg assembly mount, and the configuration of each load bearing face is substantially complementary to its corresponding leg receiving angled bearing face.

29. The apparatus of claim 28, wherein the leg receiving angled bearing faces are disposed at an angle from vertical of approximately 550 degrees.

30. The walking staff of claim 28, further wherein the leg assembly mount comprises:
a mounting plate coupled to the shaft; and
a mounting disk coupled to the mounting plate;
wherein each leg is pivotably coupled to the leg assembly mount by a lateral pin that is coupled to an upper end of the leg and is captured within a recess in at least one of the mounting plate and the mounting disk.

31. A walking staff, comprising:
a shaft;
a plate coupled to an upper end of the shaft;
a disk member including a mechanism that couples to an object;
a magnet affixed to a first one of the plate and the disk member;
wherein another, second one of the plate and the disk member, to which the magnet is affixed, is comprised of magnetically active material and includes a recess into which the magnet fits, and a lip surrounding the recess, whereby radial movement of the magnet is prevented by the lip, and whereby the object is radially coupled to the walking staff by magnetic attraction between the magnet and the second one of the plate and the disk.

32. The walking staff of claim 31, wherein the plate is coupled to the shaft by a swiveling ball and socket mechanism.

33. The walking staff of claim 31, further comprising:
a plurality of legs pivotably coupled a lower end of the shaft such that the legs can be stowed into a monopod configuration substantially coaxial with the shaft, and such that the legs can be deployed into a tripod configuration.

34. The walking staff of claim 28, wherein each of the load bearing faces and the angled bearing faces are substantially planar and configured in a substantially parallel arrangement where a given load bearing face contacts its corresponding angled bearing face.

* * * * *